(12) United States Patent
Hu et al.

(10) Patent No.: US 9,794,362 B2
(45) Date of Patent: Oct. 17, 2017

(54) PORTAL PUSH METHOD AND NETWORK EQUIPMENT

(71) Applicant: Huawei Technologies Co., Ltd., Shenzhen (CN)

(72) Inventors: Junli Hu, Shenzhen (CN); Lili Wang, Shenzhen (CN); Chi Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 280 days.

(21) Appl. No.: 14/666,902

(22) Filed: Mar. 24, 2015

(65) Prior Publication Data

US 2015/0195370 A1    Jul. 9, 2015

Related U.S. Application Data

(63) Continuation of application No. PCT/CN2013/083432, filed on Sep. 13, 2013.

(30) Foreign Application Priority Data

Sep. 29, 2012   (CN) .......................... 2012 1 0370672

(51) Int. Cl.
*H04L 29/08* (2006.01)
*G06Q 30/02* (2012.01)
(Continued)

(52) U.S. Cl.
CPC ............. *H04L 67/26* (2013.01); *G06Q 30/02* (2013.01); *H04L 67/02* (2013.01);
(Continued)

(58) Field of Classification Search
CPC ....... H04L 12/463; H04L 12/66; H04L 63/08; H04L 12/581; H04W 12/02; H04W 12/08; H04W 12/06; H04W 12/12; G06Q 30/02

See application file for complete search history.

(56) References Cited

U.S. PATENT DOCUMENTS

| | | |
|---|---|---|
| 6,636,894 B1 | 10/2003 | Short et al. |
| 2004/0010719 A1* | 1/2004 | Daenen .............. H04L 63/0227 726/6 |

(Continued)

FOREIGN PATENT DOCUMENTS

| | | |
|---|---|---|
| CA | 2698604 A1 | 5/2001 |
| CN | 101217560 A | 7/2008 |

(Continued)

*Primary Examiner* — Chirag R Patel
(74) *Attorney, Agent, or Firm* — Leydig, Voit & Mayer, Ltd.

(57) ABSTRACT

Disclosed is a portal push method, which comprises: a broadband remote access server (BRAS) equipment acquiring a website identification list, after the BRAS equipment receives a hypertext transport protocol (HTTP) request message sent by a user terminal. The BRAS equipment determines whether to send portal pages to the user terminal according to whether the identification of a target website visited by the user client has a matched item in the list. The embodiments of the present disclosure further provide a corresponding BRAS equipment. The technical solutions of the embodiments of the present disclosure can reduce push times of invalid portals and improve portal push success rate.

14 Claims, 4 Drawing Sheets

(51) Int. Cl.
*H04W 12/06* (2009.01)
*H04W 12/08* (2009.01)
(52) U.S. Cl.
CPC ......... *H04L 67/2814* (2013.01); *H04W 12/06* (2013.01); *H04W 12/08* (2013.01)

(56) References Cited

U.S. PATENT DOCUMENTS

| | | | |
|---|---|---|---|
| 2006/0056317 A1* | 3/2006 | Manning | H04L 29/06 370/254 |
| 2008/0279200 A1* | 11/2008 | Shatzkamer | H04L 63/0892 370/401 |
| 2012/0166662 A1 | 6/2012 | Iyer | |
| 2012/0173699 A1* | 7/2012 | Niemela | H04L 63/101 709/224 |
| 2012/0246553 A1 | 9/2012 | Ong | |
| 2013/0117451 A1* | 5/2013 | Du | H04L 63/10 709/225 |

FOREIGN PATENT DOCUMENTS

| | | |
|---|---|---|
| CN | 101217568 A | 7/2008 |
| CN | 101741888 A | 6/2010 |
| CN | 102075583 A | 5/2011 |
| CN | 102868758 A | 1/2013 |

* cited by examiner

PORTAL PUSH METHOD AND NETWORK EQUIPMENT

CROSS-REFERENCE TO RELATED APPLICATIONS

This application is a continuation of International Application No. PCT/CN2013/083432, filed on Sep. 13, 2013, which claims priority to Chinese Patent Application No. 201210370672.2, filed on Sep. 29, 2012, both of which are hereby incorporated by reference in their entireties.

TECHNICAL FIELD

The present disclosure relates to the field of communications, and in particular, to a portal push method and a network device thereof.

BACKGROUND

When a user needs to surf the Internet, the user may start a browser, such as Internet Explorer®, installed on a user terminal after an authentication-request initiated by the user via the user terminal is successful. After the user inputs a webpage address into an address bar of the browser in the user terminal, the user terminal may initiate a Hypertext Transfer Protocol (HTTP) request to a broadband remote access server (BRAS) device. After receiving the HTTP request, the BRAS device may send to the user terminal a Uniform Resource Locator (URL) of a portal page via HTTP redirecting, such that the browser on the user terminal may display an advertisement page or a portal page. Then the BRAS device allows the user terminal to access the Internet. The above process is referred to as portal push. Currently, operators conduct the portal push mainly to push advertisement pages or push arrear reminder pages.

With the explosive increase of Internet services, it is common that after the authentication-request initiated by the user terminal is successful, an application program on the user terminal has automatically initiated one or more HTTP requests before the user initiatively browses a webpage via the browser for the first time. The BRAS device may commence the portal push to the user terminal after receiving the HTTP request sent by the user terminal. Since the portal push is generally conducted only at the first receipt of the HTTP request on the BRAS device, the portal page pushed by the BRAS device is not presented on the browser of the user terminal in this case, and therefore the portal push is ineffective as the purpose for the push is failed, i.e., the success rate of portal push is low. Even if the BRAS device is configured to conduct the portal push every time it receives the first few HTTP requests, the success rate of the portal push is still low in that the first few HTTP requests may be sent automatically by an application program on the user terminal before the user starts the browser for webpage browsing.

SUMMARY

It is to provide a portal push method, through which the ineffective portal push may be reduced and the success rate of portal push may be improved.

In a first aspect, a portal push method is provided, including:

obtaining, by a BRAS device, a list of website identifiers;

receiving, by the BRAS device, a HTTP request packet sent by a user terminal, where the HTTP request packet carries an identifier of a target website to be accessed by the user terminal; and determining, by the BRAS device, whether to send a portal page to the user terminal based on whether the identifier of the target website has a match in the list of website identifiers.

In a first possible implementation of the method, the list of website identifiers includes identifiers of target websites to which a user accesses initiatively;

The process of determining, by the BRAS device, whether to send a portal page to the user terminal based on a determination of whether the identifier of the target website to be accessed by the user terminal has a match in the list of website identifiers includes:

refraining, by the BRAS device, from sending the portal page to the user terminal in a case that the BRAS device determines that the identifier of the target website to be accessed by the user terminal has no match in the list of website identifiers; or sending, by the BRAS device, the portal page to the user terminal by HTTP redirecting in a case that the BRAS device determines that the identifier of the target website to be accessed by the user terminal has a match in the list of website identifiers.

Based on the first aspect, a second possible implementation is provided, where the list of website identifiers includes the identifier of the target website to which an access is initiated automatically by the user terminal.

The process of determining, by the BRAS device, whether to send the portal page to the user terminal based on a determination of whether the identifier of the target website to be accessed by the user terminal has a match in the list of website identifiers includes:

refraining, by the BRAS device, from sending the portal page to the user terminal in a case that the BRAS device determines that the identifier of the target website to be accessed by the user terminal has a match in the list of website identifiers; or sending, by the BRAS device, the portal page to the user terminal by HTTP redirecting in a case that the BRAS device determines that the identifier of the target website to be accessed by the user terminal has no match in the list of website identifiers.

Based on the first aspect or the first possible implementation of the first aspect, or the second possible implementation, a third possible implementation is provided, where the process of obtaining, by the BRAS device, the list of website identifiers includes:

receiving, by the BRAS device, a Remote Authentication Dial In User Service (RADIUS) packet sent by an Authentication, Authorization and Accounting (AAA) server, where the RADIUS packet carries the list of website identifiers.

Based on the third possible implementation, a fourth possible implementation is provided, where the RADIUS packet carries the list of website identifiers by:

carrying the list of website identifiers in a Vendor-Specific attribute in the RADIUS packet.

Based on the first aspect, the first possible implementation of the first aspect, or the second possible implementation, a fifth possible implementation is provided, where the process of obtaining, by the RADIUS packet, the list of website identifiers includes:

receiving, by the BRAS device, a command line for creating the list of website identifiers on the BRAS device.

Based on the first aspect, the first possible implementation of the first aspect, or any one from the second to the fifth possible implementations of the method, a sixth possible implementation is provided, where the website identifier in the list of website identifiers includes an IP address and/or a domain name.

A BRAS device is provided, including:

a list receiving unit, configured to obtain a list of website identifiers;

a packet receiving unit, configured to receive a HTTP request packet sent from a user terminal, where the HTTP request packet carries an identifier of a target website to be accessed by the user terminal; and a determining unit, configured to determine whether to send a portal page to the user terminal based on whether the identifier of the target website has a match in the list of website identifiers.

In a first possible implementation of the second aspect, the list of website identifiers includes identifiers of target websites to which a user accesses initiatively, and the determining unit is further configured to refrain from sending a portal page to the user terminal in a case that it is determined that the identifier of the target website to be accessed by the user terminal has no match in the list of website identifiers, or send the portal page to the user terminal by HTTP redirecting in a case that it is determined that the identifier of the target website to be accessed by the user terminal has a match in the list of website identifiers.

Based on the second aspect, a seventh possible implementation is provided, where the list of website identifiers includes the identifier of the target website to which an access is initiated automatically by the user terminal.

The determining unit is further configured to refrain from sending the portal page to the user terminal in a case that it is determined that the identifier of the target website to be accessed by the user terminal has a match in the list of website identifiers, or send the portal page to the user terminal by HTTP redirecting in a case that it is determined that the identifier of the target website to be accessed by the user terminal has no match in the list of website identifiers.

Based on the second aspect, the first possible implementation of the second aspect, or the seventh possible implementation, an eighth possible implementation is provided, where the list receiving unit is further configured to receive a RADIUS packet sent by an AAA server, where the RADIUS packet carries the list of website identifiers.

Based on the eighth possible implementation, a ninth possible implementation is provided, where the RADIUS packet carries the list of website identifiers by:

carrying the list of website identifiers in a Vendor-Specific attribute in the RADIUS packet.

Based on the second aspect, the first possible implementation of the second aspect, or the seventh possible implementation, a tenth possible implementation is provided, where the list receiving unit is further configured to receive a command line for creating the list of website identifiers in the BRAS device.

Based on the second aspect, the first possible implementation of the second aspect, or any one from the seventh to the tenth possible implementations, an eleventh possible implementation is provided, where the website identifier in the list of website identifiers includes an IP address and/or a domain name.

In the technical solutions provided according to the embodiments of the disclosure, by means of configuring a list of website identifiers in a BRAS device, the BRAS device determines, after receiving a HTTP request packet sent by a user terminal, whether to send a portal page to the user terminal based on a determination of whether the identifier of the target website to be accessed by the user terminal has a match in the list of website identifiers, thereby reducing an ineffective portal push and improving a success rate of portal push.

DETAILED DESCRIPTION OF THE EMBODIMENTS

The technical solutions according to the embodiments of the disclosure will be specified in the following in conjunction with drawings and embodiments.

Figure 1:
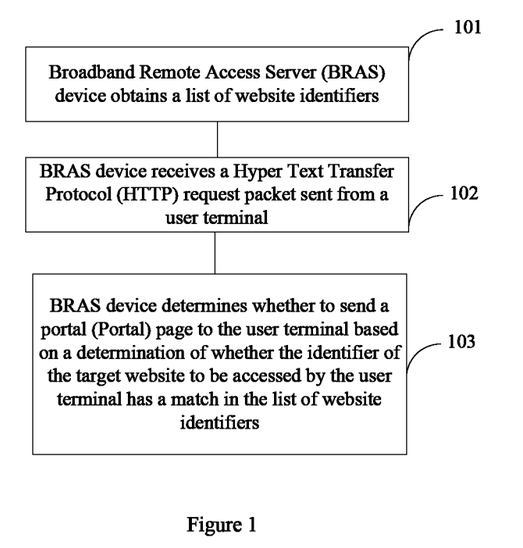
FIG. 1 is a flowchart for a portal push method, according to an embodiment of the disclosure.

As shown in FIG. 1, a portal push method is provided according to an embodiment of the disclosure, including the steps from S101 to S103 as follows.

In step S101, a BRAS device obtains a list of website identifiers.

The BRAS device may be an independent BRAS device, a router with BRAS function, or an Access Controller (AC) device in a Wireless Local Area Network.

For example, the website identifier in the list may be in the form of an IP address or a domain name of the website, or may be in the form of both the IP address and the domain name. The list may include only the IP address of a website, only the domain name of the website, or both the IP address and the domain name of the website.

Supposing that there are three websites on the list, for example, www.sina.com (supposing that the IP address of the website is 174.35.40.20, the same in the following), www.baidu.com (supposing that the IP address of the website is 220.181.111.147, the same in the following), and www.google.com (supposing that the IP address of the website is 74.125.128.103, the same in the following), and then the list of website identifiers may be in the following forms:

Example 1 www.sina.com.cn
www.baidu.com
www.google.com

Example 2

174.35.40.20
220.181.111.147
74.125.128.103

Example 3 www.sina.com.cn
220.181.111.147
www.google.com

Example 4 www.sina.com.cn
174.35.40.20
www.baidu.com
220.181.111.147
www.google.com
74.125.128.103

The foregoing examples are only certain combinations of identifiers, and are not meant limit the disclosure.

In some cases, a website may be identified with multiple IP addresses. For example, the IP address of www.sina.com.cn varies in different regions, and all the IP addresses of www.sina.com.cn may be included in the list of website identifiers. The list of website identifiers may only include a few of the IP addresses of www.sina.com.cn, such as the IP address for www.sina.com.cn in a region where the user terminal resides, such that the list of website identifiers may be shorter.

In addition, the website may be identified with part of the domain name for the website, to save the storage space.

For example, the BRAS device may obtain the list of website identifiers in at least one of the following two ways.

In way 1, the BRAS device receives a RADIUS packet sent from an AAA server, where the RADIUS packet carries the list of website identifiers.

In way 2, the BRAS device receives a command line for creating the list of website identifiers on the BRAS device.

The way 1 may be specified as follows.

The RADIUS packet in the way 1 refers to the RADIUS packet sent from the AAA server to the BRAS device, which may be an Access-Accept packet or a Change-of-Authorization request packet (COA request packet). In a case that the list of website identifiers is too long to be carried completely in one RADIUS packet, the AAA server may distribute the list in multiple RADIUS packets to be send to the BRAS device, e.g., a part of the list of website identifiers is carried in the RADIUS Access-Accept packet, and the rest is carried in the RADIUS COA request packet.

For example, the list of website identifiers may be carried in a Vendor-Specific attribute in the RADIUS packet sent by the AAA server to the BRAS device.

The RADIUS packet defines multiple attributes each in a Type-Length-Value (TLV) structure. The Type field in the TLV structure is to identify a type of the attribute. The attribute with a Type value of 26 is called the Vendor-Specific attribute. The Vendor-Specific attribute is also in a TLV structure. A format of the Vendor-Specific attribute, which is recommended by the RADIUS protocol, is shown as follows:

```
     0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    |     Type      |    Length     |            Vendor-Id
    +-+-+-+-+-+-+-+-+-+-+-+-+-+-+-+-+-+-+-+-+-+-+-+-+-+-+-+-+-+-+-+-+
         Vendor-Id (cont)           |  Vendor type  | Vendor length |
    +-+-+-+-+-+-+-+-+-+-+-+-+-+-+-+-+-+-+-+-+-+-+-+-+-+-+-+-+-+-+-+-+
    |   Attribute-Specific...
    +-+-+-+-+-+-+-+-+-+-+-+-+-+-
``` where:
the value of the Type field is 26;
the value of the Length field is a length of the attribute;
the value of the Vendor-Id field is an identifier of the vendor; and
the fields of Vendor-type, the Vendor length and the Attribute-Specific following the Vendor-Id field forms another TLV structure which is called as a sub-attribute of the Vendor-Specific attribute, where the information to be carried may be defined in the sub-attribute. The Vendor-Specific attribute may carry multiple sub-attributes.

For example, the list of website identifiers may be carried in the sub-attribute of the Vendor-Specific attribute in the following "way a" and "way b."

In way a, two sub-attributes of different types, i.e., a sub-attribute 1 and a sub-attribute 2, are defined, where the sub-attribute 1 carries the website identifiers in the form of IP address in the list of website identifiers, and the sub-attribute 2 carries the website identifiers in the form of domain name in the list of website identifiers.

For example, the value of the Type field in the TLV of the sub-attribute 1 is 190, and the Attribute-Specific in the TLV of the sub-attribute 1 carries the website identifiers in the form of IP address in the list of website identifiers, which may be realized by defining the TLVs in the Attribute-Specific field of the sub-attribute 1 and storing one website identifier in the form of IP address in each TLV. Alternatively, the website identifier in the form of IP address may be carried in the sub-attribute 1 by other means.

The value of the Type field in the TLV of the sub-attribute 2 is 191, the Attribute-Specific in the TLV of the sub-attribute 1 carries the website identifiers in the form of domain name in the list of website identifiers. The website identifiers in the form of domain name are expressed as a string, hence the website identifiers may be distinguished by adding a special delimiter following each website identifier in the form of domain name, or by defining TLVs in the Attribute-Specific field of the sub-attribute 2 and storing one website identifier in the form of domain name in each TLV. Alternatively, the website identifier in the form of domain name may be carried in the sub-attribute 2 by other means.

In way b, a sub-attribute called a sub-attribute 3 is defined, where the sub-attribute 3 carries both the website identifiers in the form of IP address and the website identifiers in the form of domain name in the list of website identifiers. TLVs may be defined in the Attribute-Specific field of the sub-attribute 3 and one website identifier is stored in each TLV. Alternatively, the website identifier in the form of domain name may be carried in the sub-attribute 2 by other means.

The way 2 is specified in the following.

The BRAS device receives a command line for creating the list of website identifiers on the BRAS device.

For example, maintenance personnel of the BRAS device may input the list of website identifiers via inputting into the BRAS device an Access Control List (ACL) command or other commands.

In step S102, the BRAS device receives a HTTP request packet sent from a user terminal, where the HTTP request packet carries an identifier of a target website to be accessed by the user terminal.

For example, the user terminal may send the HTTP request packet to the BRAS device after the user inputs an address of a webpage to be accessed into an address bar of the browser on the user terminal, where the HTTP request packet carries the identifier of the target website where the webpage resides.

For another example, the user terminal may also send the HTTP request packet to the BRAS device in a case that an application program on the user terminal automatically initiates to access a certain website, where the HTTP request packet carries the identifier of the target website to be accessed by the application program.

After receiving the HTTP request packet sent by the user terminal, the BRAS device obtains the identifier of the target website to be accessed by the user terminal.

The identifier of the target website to be accessed by the user terminal may be the IP address or the domain name of the target website.

For example, after the user inputs a string "http://www.sina.com.cn" into the address bar of the browser on the user terminal and presses the Enter key, the BRAS device receives the HTTP request packet sent by the user terminal and obtains from the HTTP request packet the IP address "174.35.40.20" (e.g., the IP address of www.sina.com.cn is 174.35.40.20) of the target website to be accessed by the user.

In S103, the BRAS device determines whether to send a portal page to the user terminal based on a determination of whether the identifier of the target website to be accessed by the user terminal has a match in the list of website identifiers.

The BRAS device determines whether to send the portal page to the user terminal based on the determination of whether the identifier of the target website to be accessed by the user terminal has a match in the list of website identifiers, rather than conducting the portal push at the receipt of the HTTP request from the user terminal as in the conventional technology, thereby reducing the conventionally ineffective portal push and improving the success rate of portal push.

The rule for determining whether the identifier of the target website to be accessed by the user terminal has a match in the list of website identifiers is specified in the following.

The illustration is made by taking the case that the identifier of the target website to be accessed by the user terminal is the IP address of the target website as an example.

If the IP address the target website is "174.35.40.20", and the list of website identifiers includes a website identifier "174.35.40.20," then it may be determined that the identifier of the target website to be accessed by the user terminal has a match in the list of website identifiers.

For another example, if the IP address the target website is "174.35.40.20," and the list of website identifiers includes a website identifier "www.sina.com.cn", then it may be determined that the identifier of the target website to be accessed by the user terminal has a match in the list of website identifiers since it may be determined from domain name resolution that the IP address of "www.sina.com.cn" is "174.35.40.20."

For another example, if the IP address the target website is "174.35.40.20," and there is no identifier of "www.sina.com.cn" or "174.35.40.20" in the list of website identifiers, it may be determined that the identifier of the target website to be accessed by the user terminal has no match in the list of website identifiers.

In the portal push method provided according to an embodiment of the disclosure, by means of configuring a list of website identifiers in a BRAS device, the BRAS device determines, after receiving a HTTP request packet sent by a user terminal, whether to send a portal page to the user terminal based on a determination of whether the identifier of the target website to be accessed by the user terminal has a match in the list of website identifiers, thereby reducing the ineffective portal push and improving the success rate of portal push.

Figure 2:
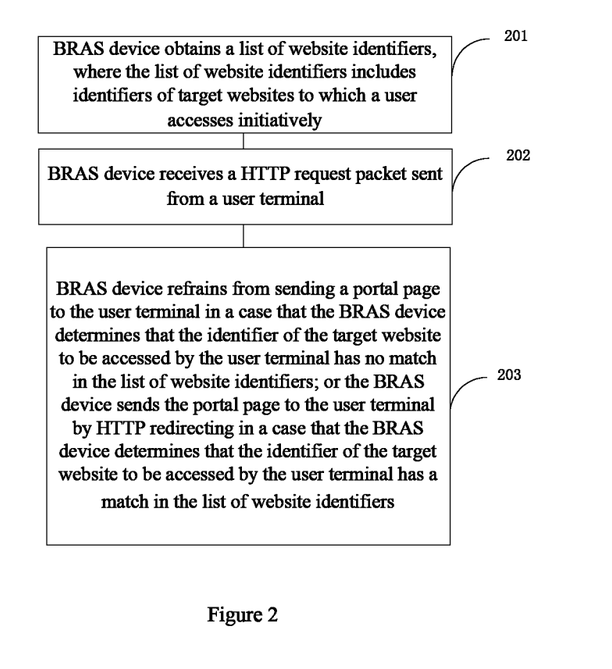
FIG. 2 is a flowchart for a portal push method, according to another embodiment of the disclosure.

As shown in FIG. 2, a portal push method is provided according to an embodiment of the disclosure, including the steps from S201 to S203 as follows.

In step S201, a BRAS device obtains a list of website identifiers, where the list of website identifiers includes identifiers of target websites to which a user accesses initiatively.

For the process of the BRAS device to obtain the list of website identifiers and the form of the website identifiers in the list, reference may be made to the description of step S101 shown in FIG. 1 and detailed description thereof is omitted herein.

For example, the list of website identifiers in the step S201 may be set by an operator, and the websites on the list may be the websites frequently accessed by the user or the websites the user likes. For the convenience of description, the list of website identifiers in the step S201 may be called "white list".

In step S202, the BRAS device receives a HTTP request packet sent from a user terminal, where the HTTP request packet carries an identifier of a target website to be accessed by the user terminal.

In step S203, the BRAS device may refrain from sending a portal page to the user terminal in a case that the BRAS device determines that the identifier of the target website to be accessed by the user terminal has no match in the list of website identifiers; or the BRAS device may send the portal page to the user terminal by HTTP redirecting in a case that the BRAS device determines that the identifier of the target website to be accessed by the user terminal has a match in the list of website identifiers.

For the rule of determining whether the identifier of the target website to be accessed by the user terminal has a match in the list of website identifiers, reference may be made to the description of step S103 shown in FIG. 1 and detailed description thereof is omitted herein.

In the portal push method provided according to an embodiment of the disclosure, by means of setting a white list in the BRAS device, after receiving a HTTP request packet sent by a user terminal, the BRAS device may refrain from sending a portal page to the user terminal in a case that the BRAS device determines that the identifier of the target website to be accessed by the user terminal has no match in the white list; or the BRAS device may send the portal page to the user terminal by HTTP redirecting in a case that the BRAS device determines that the identifier of the target website to be accessed by the user terminal has a match in the white list, thereby reducing the ineffective portal push and improving the success rate of portal push.

Figure 3:
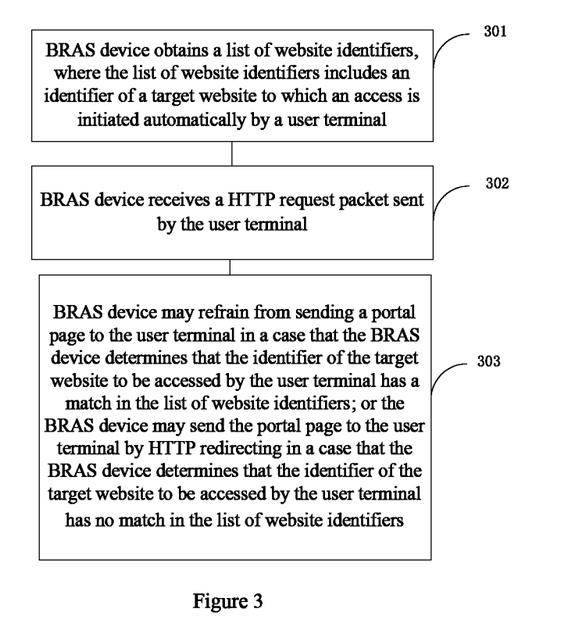
FIG. 3 is a flowchart for a portal push method, according to another embodiment of the disclosure.

As shown in FIG. 3, a portal push method is provided according to an embodiment of the disclosure, including the steps from S301 to S303 as follows.

In step S301, a BRAS device obtains a list of website identifiers, where the list of website identifiers includes an identifier of a target website to which an access is initiated automatically by a user terminal.

For the process of the BRAS device to obtain the list of website identifiers and the form of the website identifiers in the list, reference may be made to the description of step S101 shown in FIG. 1 and detailed description thereof is omitted herein.

The expression that an access is initiated automatically by a user terminal refers to the case that the HTTP request is initiated automatically by a software on the user terminal, rather than triggered by an initial accessing of the user. For example, the HTTP request initiated by an instant messenger installed on the user terminal is an exemplary access initiated automatically by the user terminal. For example, the list of website identifiers in the foregoing step S301 may be set by the operator as including the common websites which are automatically accessed by background software of the user terminal. For the convenience of description, the list of website identifiers in the foregoing step S301 may be called "black list".

In step S302, the BRAS device receives a HTTP request packet sent by the user terminal, where the HTTP request packet carries an identifier of a target website to be accessed by the user terminal.

In step S303, the BRAS device may refrain from sending a portal page to the user terminal in a case that the BRAS device determines that the identifier of the target website to be accessed by the user terminal has a match in the list of website identifiers; or the BRAS device may send the portal page to the user terminal by HTTP redirecting in a case that the BRAS device determines that the identifier of the target website to be accessed by the user terminal has no match in the list of website identifiers.

For the rule of determining whether the identifier of the target website to be accessed by the user terminal has a match in the list of website identifiers, reference may be made to the description of step S103 shown in FIG. 1 and detailed description thereof is omitted herein.

In the portal push method provided according to an embodiment of the disclosure, by means of setting a black list in the BRAS device, after receiving a HTTP request packet sent by a user terminal, the BRAS device may refrain from sending a portal page to the user terminal in a case that the BRAS device determines that the identifier of the target website to be accessed by the user terminal has a match in the black list; or the BRAS device may send the portal page to the user terminal by HTTP redirecting in a case that the BRAS device determines that the identifier of the target website to be accessed by the user terminal has no match in the black list, thereby reducing the ineffective portal push and improving the success rate of portal push.

As an example, in the embodiments illustrated in the FIG. 1 to FIG. 3, the list of website identifiers may be distinguishable for different users or user groups, i.e., the setting of the list of website identifiers varies among different users or user groups, thereby the portal push may be more targeted.

Figure 4:
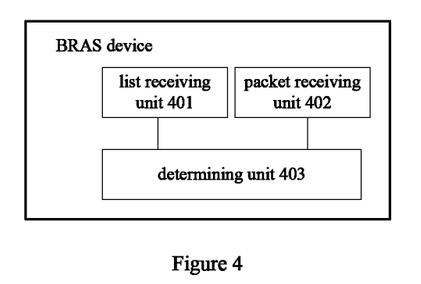
FIG. 4 is a schematic diagram of a BRAS device, according to an embodiment of the disclosure.

As shown in FIG. 4, a BRAS device is provided according to an embodiment of the disclosure, including:

a list receiving unit 401, configured to obtain a list of website identifiers;

a packet receiving unit 402, configured to receive a HTTP request packet sent from a user terminal, where the HTTP request packet carries an identifier of a target website to be accessed by the user terminal; and a determining unit 403, configured to determine whether to send a portal page to the user terminal based on a determination of whether the identifier of the target website to be accessed by the user terminal has a match in the list of website identifiers.

As an example, the list of website identifiers includes identifiers of target websites to which a user accesses initiatively, and the determining unit 403 is configured to refrain from sending a portal page to the user terminal in a case that it is determined that the identifier of the target website to be accessed by the user terminal has no match in the list of website identifiers, or send the portal page to the user terminal by HTTP redirecting in a case that it is determined that the identifier of the target website to be accessed by the user terminal has a match in the list of website identifiers.

As another example, the list of website identifiers includes the identifier of the target website to which an access is initiated automatically by the user terminal, and the determining unit 403 is configured to refrain from sending the portal page to the user terminal in a case that it is determined that the identifier of the target website to be accessed by the user terminal has a match in the list of website identifiers, or send the portal page to the user terminal by HTTP redirecting in a case that it is determined that the identifier of the target website to be accessed by the user terminal has no match in the list of website identifiers.

For example, the list receiving unit 401 is configured to receive a RADIUS packet sent from an AAA server, where the RADIUS packet carries the list of website identifiers.

For example, RADIUS packet carries the list of website identifiers in a way that the list of website identifiers is carried in a Vendor-Specific attribute in the RADIUS packet.

For another example, the list receiving unit 401 is configured to receive a command line for creating the list of website identifiers on the BRAS device.

For example, the website identifier in the list of website identifiers includes an IP address and/or a domain name.

In the BRAS device provided according to an embodiment of the disclosure, by means of configuring a list of website identifiers in a BRAS device, the BRAS device determines, after receiving a HTTP request packet sent by a user terminal, whether to send a portal page to the user terminal based on a determination of whether the identifier of the target website to be accessed by the user terminal has a match in the list of website identifiers, thereby reducing the ineffective portal push and improving the success rate of portal push.

As an example, the units in the embodiment shown in FIG. 4 may be integrated into one or more units.

For another example, all the units may be embodied as hardware. Those skilled in the art may understand that, a few or all of the steps in the methods provided according to the foregoing embodiments may be implemented by instructing the relevant hardware via a program, and the program may be stored in a computer-readable storage medium. For example, the storage medium may include a read-only memory, a random access memory, a disk or an optical disk.

Figure 5:
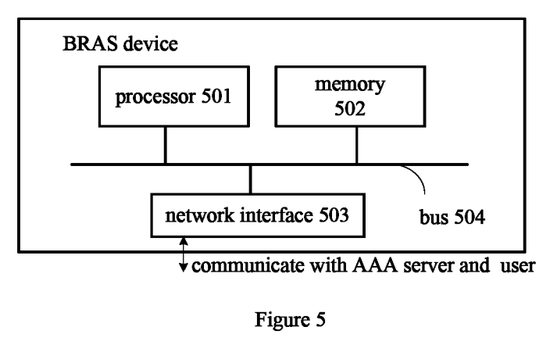
FIG. 5 is a schematic diagram of a BRAS device, according to an embodiment of the disclosure.

As shown in FIG. 5, a BRAS device is provided according to an embodiment of the disclosure, including: a network interface 503, a processor 501, a memory 502 and a bus 504.

The network interface 503, the processor 501 and the memory 502 are communicated with each other via the bus 504.

The network interface 503 is configured for a communication between an AAA server and a user terminal.

The processor 501 is configured to execute program instructions.

The memory 502 is configured to store the program instructions, where the program instructions are configured to:

obtain the list of website identifiers;

receive a HTTP request packet sent from the terminal, where the HTTP request packet carries an identifier of a target website to be accessed by the user terminal;

determine whether to send a portal page to the user terminal based on a determination of whether the identifier of the target website to be accessed by the user terminal has a match in the list of website identifiers.

As an example, the list of website identifiers includes identifiers of target websites to which a user accesses initiatively. It is refrained from sending a portal page to the user terminal in a case that the processor 501 determines that the identifier of the target website to be accessed by the user terminal has no match in the list of website identifiers, or the portal page may be sent to the user terminal by HTTP redirecting in a case that the processor 501 determines that the identifier of the target website to be accessed by the user terminal has a match in the list of website identifiers.

As another example, the list of website identifiers includes the identifier of the target website to which an access is initiated automatically by the user terminal. It is refrained from sending a portal page to the user terminal in a case that the processor 501 determines that the identifier of the target website to be accessed by the user terminal has a match in the list of website identifiers, or the portal page may be sent to the user terminal by HTTP redirecting in a case that the processor 501 determines that the identifier of the target website to be accessed by the user terminal has no match in the list of website identifiers.

As an example, a RADIUS packet sent from the AAA server is received via the network interface 303, where the RADIUS packet carries the list of website identifiers, and the list of website identifiers is obtained from the RADIUS packet.

As an example, the list of website identifiers may be carried in a Vendor-Specific attribute in the RADIUS packet.

As an example, the BRAS device receives a command line for creating the list of website identifiers on the BRAS device.

As an example, the website identifier in the list of website identifiers includes an IP address and/or a domain name.

In the BRAS device provided according to the foregoing embodiment of the disclosure, by means of obtaining a list of website identifiers, a determination whether to send a portal page to a user terminal is made based on a determination of whether the identifier of the target website to be accessed by the user terminal has a match in the list of website identifiers, thereby reducing the ineffective portal push and improving the success rate of portal push By the foregoing description, the portal push method and the network device thereof are detailed. The foregoing description of the embodiments is only to facilitate the understanding of the method and the core concept of the disclosure rather than to restrict the disclosure. The variation or replacement made by those skilled in the art within the technical scope of the disclosure fall into the protection scope of the disclosure.

What is claimed is:

1. A portal push method, comprising:
   obtaining, by a Broadband Remote Access Server (BRAS) device, a list of website identifiers, wherein the list of website identifiers comprises identifiers of websites to which accesses are initiated by a user terminal in response to instructions from a user of the user terminal;
   receiving, by the BRAS device, a Hypertext Transfer Protocol (HTTP) request packet sent from the user terminal, wherein the HTTP request packet carries an identifier of a target website to be accessed by the user terminal; and
   determining, by the BRAS device, whether to send a portal page to the user terminal based on whether the identifier of the target website has a match in the list of website identifiers, wherein determining whether to send the portal page to the user terminal comprises:
   in response to determining that the identifier of the target website to be accessed by the user terminal has no match in the list of website identifiers, refraining, by the BRAS device, from sending the portal page to the user terminal; or
   in response to determining that the identifier of the target website to be accessed by the user terminal has a match in the list of website identifiers, sending, by the BRAS device, the portal page to the user terminal by HTTP redirecting.

2. The method according to claim 1, wherein the step of obtaining, by the BRAS device, the list of website identifiers comprises:
   receiving, by the BRAS device, a Remote Authentication Dial In User Service (RADIUS) packet sent from an Authentication, Authorization and Accounting (AAA) server, wherein the RADIUS packet carries the list of website identifiers.

3. The method according to claim 2, wherein the RADIUS packet carries the list of website identifiers in a Vendor-Specific attribute in the RADIUS packet.

4. The method according to claim 1, wherein the step of obtaining, by the BRAS device, the list of website identifiers comprises:
   receiving, by the BRAS device, a command line for creating the list of website identifiers on the BRAS device.

5. The method according to claim 1, wherein an identifier in the list of website identifiers comprises at least one of an IP address and a domain name.

6. A Broadband Remote Access Server (BRAS) device, comprising:
   a memory that stores program instructions; and
   a processor configured to execute the program instruction to cause the BRAS device to:
   obtain a list of web site identifiers, wherein the list of website identifiers comprises identifiers of websites to which accesses are initiated by a user terminal in response to instructions from a user of the user terminal;
   receive a Hypertext Transfer Protocol (HTTP) request packet sent from the user terminal, wherein the HTTP request packet carries an identifier of a target website to be accessed by the user terminal; and
   determine whether to send a portal page to the user terminal based on whether the identifier of the target website has a match in the list of website identifiers, wherein determining whether to send the portal page to the user terminal comprises:
   in response to determining that the identifier of the target website to be accessed by the user terminal has no match in the list of website identifiers, refrain from sending the portal page to the user terminal; or
   in response to determining that the identifier of the target website to be accessed by the user terminal has a match in the list of website identifiers, send the portal page to the user terminal by HTTP redirecting.

7. The BRAS device according to claim 6, wherein the processor is further configured to execute the program instructions to cause the BRAS device to:
   receive a Remote Authentication Dial In User Service (RADIUS) packet sent from an Authentication, Authorization and Accounting (AAA) server, wherein the RADIUS packet carries the list of website identifiers.

8. The BRAS device according to claim 7, wherein the RADIUS packet carries the list of website identifiers in a Vendor-Specific attribute in the RADIUS packet.

9. The BRAS device according to claim 6, wherein processor is further configured to execute the program instructions to cause the BRAS device to:
receive a command line for creating the list of website identifiers on the BRAS device.

10. The BRAS device according to claim 6, wherein an identifier in the list of website identifiers comprises at least one of an IP address and a domain name.

11. A portal push method, comprising:
obtaining, by a Broadband Remote Access Server (BRAS) device, a list of website identifiers, wherein the list of website identifiers comprises an identifier of at least one website to which an access is initiated automatically by a user terminal;
receiving, by the BRAS device, a Hypertext Transfer Protocol (HTTP) request packet sent from the user terminal, wherein the HTTP request packet carries an identifier of a target website to be accessed by the user terminal; and
determining, by the BRAS device, whether to send a portal page to the user terminal based on whether the identifier of the target website has a match in the list of website identifiers, wherein determining whether to send the portal page to the user terminal comprises:
in response to determining that the identifier of the target website to be accessed by the user terminal has a match in the list of website identifiers, refraining, by the BRAS device, from sending the portal page to the user terminal; or
in response to determining that the identifier of the target website to be accessed by the user terminal has no match in the list of website identifiers, sending, by the BRAS device, the portal page to the user terminal by HTTP redirecting.

12. The method according to claim 11, wherein the step of obtaining, by the BRAS device, the list of website identifiers comprises:
receiving, by the BRAS device, a Remote Authentication Dial In User Service (RADIUS) packet sent from an Authentication, Authorization and Accounting (AAA) server, wherein the RADIUS packet carries the list of website identifiers.

13. A Broadband Remote Access Server (BRAS) device, comprising:
a memory that stores program instructions; and
a processor configured to execute the program instruction to cause the BRAS device to:
obtain a list of website identifiers, wherein the list of website identifiers comprises an identifier of at least one website to which an access is initiated automatically by a user terminal;
receive a Hypertext Transfer Protocol (HTTP) request packet sent from the user terminal, wherein the HTTP request packet carries an identifier of a target website to be accessed by the user terminal; and
determine whether to send a portal page to the user terminal based on whether the identifier of the target website has a match in the list of website identifiers, wherein determining whether to send the portal page to the user terminal comprises:
in response to determining that the identifier of the target website to be accessed by the user terminal has a match in the list of website identifiers, refrain from sending the portal page to the user terminal; or
in response to determining that the identifier of the target website to be accessed by the user terminal has no match in the list of website identifiers, send the portal page to the user terminal by HTTP redirecting.

14. The BRAS device according to claim 13, wherein obtaining the list of website identifiers comprises receiving a Remote Authentication Dial In User Service (RADIUS) packet sent from an Authentication, Authorization and Accounting (AAA) server, wherein the RADIUS packet carries the list of website identifiers.

* * * * *

UNITED STATES PATENT AND TRADEMARK OFFICE
CERTIFICATE OF CORRECTION

PATENT NO. : 9,794,362 B2
APPLICATION NO. : 14/666902
DATED : October 17, 2017
INVENTOR(S) : Hu et al.

It is certified that error appears in the above-identified patent and that said Letters Patent is hereby corrected as shown below:

In the Claims

Column 12, Line 37, "web site" should read -- website --.

Signed and Sealed this
Twelfth Day of June, 2018

Andrei Iancu
*Director of the United States Patent and Trademark Office*